G. O. SWANSON.
SLED RUNNER ATTACHMENT FOR VEHICLE WHEELS.
APPLICATION FILED APR. 20, 1916.

1,218,128.

Patented Mar. 6, 1917.
2 SHEETS—SHEET 1.

Witnesses
Paul A. Viersen
[signature]

Inventor
G. O. Swanson
H. J. Sanders
By
Atty.

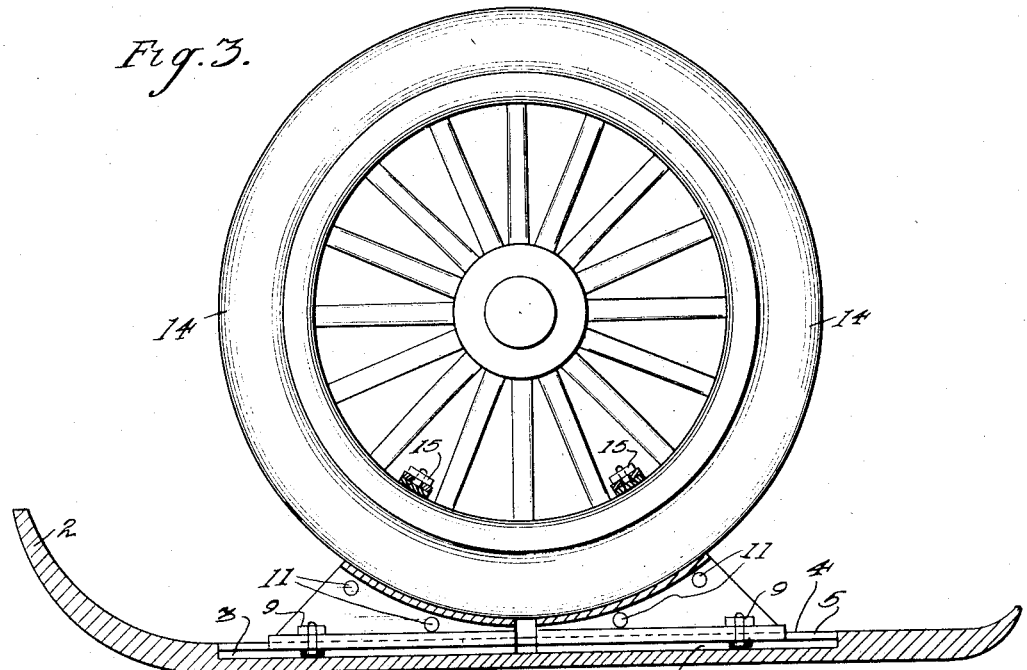
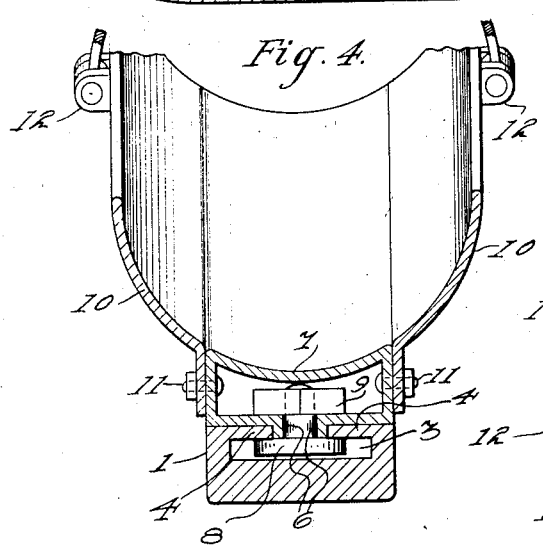
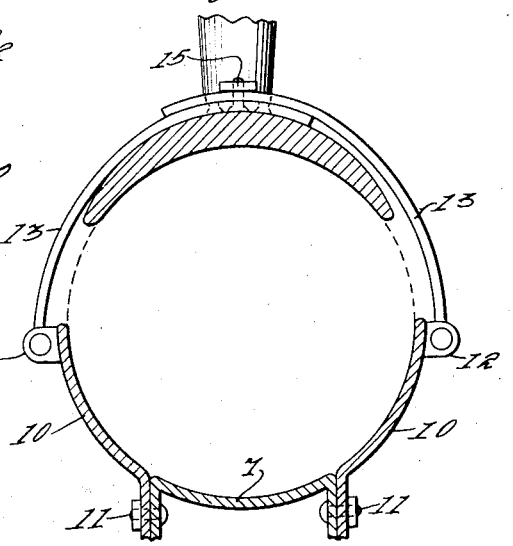

UNITED STATES PATENT OFFICE.

GUST O. SWANSON, OF LEADORE, IDAHO.

SLED-RUNNER ATTACHMENT FOR VEHICLE-WHEELS.

1,218,128.   Specification of Letters Patent.   Patented Mar. 6, 1917.

Application filed April 20, 1916. Serial No. 92,560.

*To all whom it may concern:*

Be it known that I, GUST O. SWANSON, a citizen of the United States, residing at Leadore, in the county of Lemhi and State of Idaho, have invented certain new and useful Improvements in Sled-Runner Attachments for Vehicle-Wheels, of which the following is a specification.

This invention relates to improvements in sled runner attachments for vehicle wheels and its object is to produce a device that is cheap to manufacture and that may be quickly attached to the wheels of any vehicle to convert the wheeled vehicle into a sled. Another object is to produce a device of this class that is adjustable to fit wheels of various sizes.

With the foregoing and other objects in view the invention consists in the combination and arrangement of parts to be hereinafter fully described in this specification, pointed out in the appended claims and illustrated in the accompanying drawings which form a part of said specification and in which—

Fig. 3 is a longitudinal sectional view of an adjustable form of the device applied to a vehicle wheel.

Figure 1:
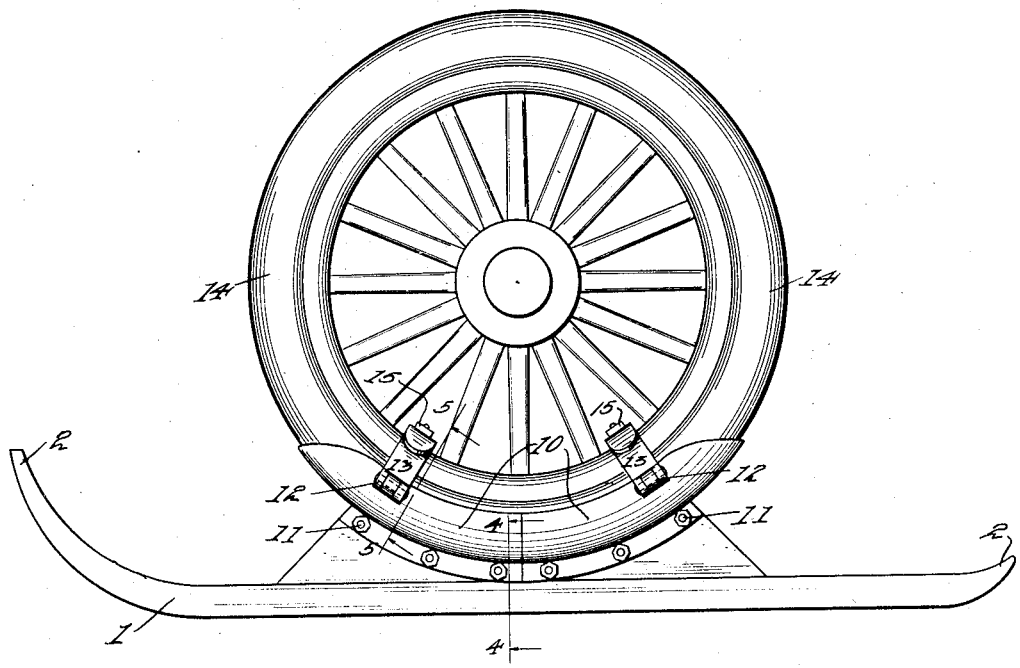
Figure 1 is a side elevation of my device applied to a vehicle wheel.
Figure 2:
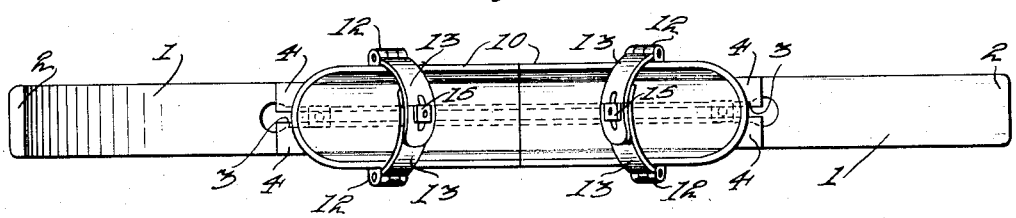
Fig. 2 is a top plan view of the device.

Figs. 4 and 5 are sections taken, respectively, on lines 4—4 and 5—5 of Fig. 1.

Like reference characters denote corresponding parts throughout the several views.

The reference numeral 1 denotes a runner having the usual upturned ends 2, 2 and which may be formed (see Figs. 3 and 4) with a longitudinal recess 3 which separates the upper face 4 of the runner from its base, the said face 4 being centrally and longitudinally slotted at 5 to permit its engagement with the downwardly bent edges 6 of a shoe 7, the base of which is slidable over the upper face 4 of the runner, said shoe being releasably retained in adjusted position upon the runner through the medium of bolts 8 carrying the nuts 9. I provide two shoes 7 of counterpart construction and adjustable with relation to each other and to the runner 1. To each shoe 7 a shell 10 is secured by bolts 11 and in bearings 12 carried upon the sides of said shell straps 13 are arranged.

The wheel 14 to be carried upon the runner is placed upon the shoe 7 after the same has been adjusted upon the runner to conform jointly to the tire of the wheel; the straps 13 are then passed about the tire and rim of the wheel and fastened together by the bolts 15 and the vehicle is ready for movement upon the runners.

What is claimed is:—

1. In a device of the class described, a runner having its upper flat face slotted longitudinally and separated from its base by a recess, shoes adapted for slidable engagement with the said upper face, locking means for retaining said shoes and runner face in adjusted position, shells carried by said shoes to receive a vehicle wheel and straps carried by said shells.

2. In a device of the class described, a runner having its upper flat face slotted longitudinally and separated from its base by a recess, shoes slidably arranged upon the upper face of said runner and formed with downwardly bent edges disposed in the slotted portion of said runner face, locking means partly disposed in the recessed portion of said runner and connecting the upper face thereof and said shoes, shells carried by said shoes to receive a vehicle wheel and straps carried by said shells.

In testimony that I claim the foregoing as my own I have hereto affixed my signature in the presence of two subscribing witnesses.

GUST O. SWANSON.

Witnesses:
JOHN E. BOHANNAN,
WALTER G. WILDE.